(No Model.) 7 Sheets—Sheet 3.
O. B. PECK.
PULVERIZING MACHINE.
No. 560,639. Patented May 19, 1896.
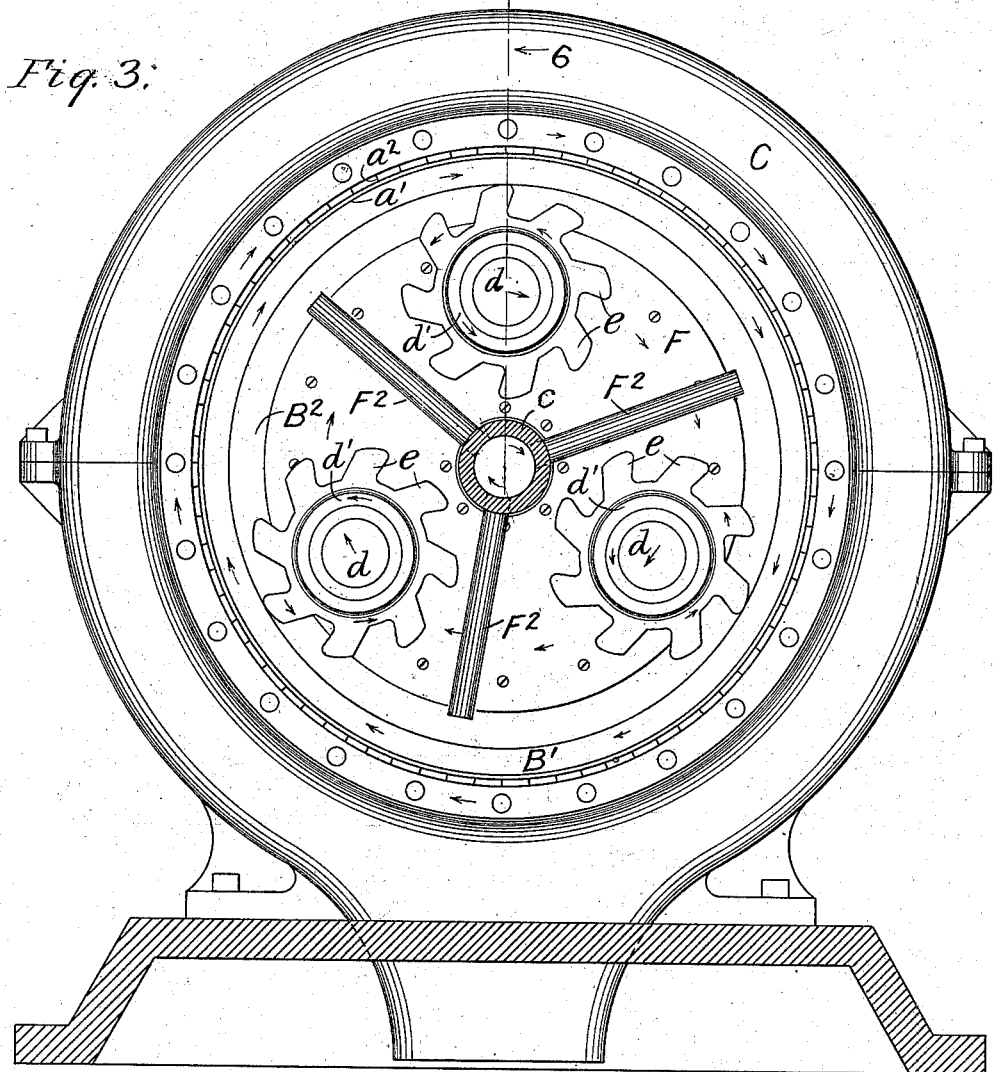
Fig. 3.
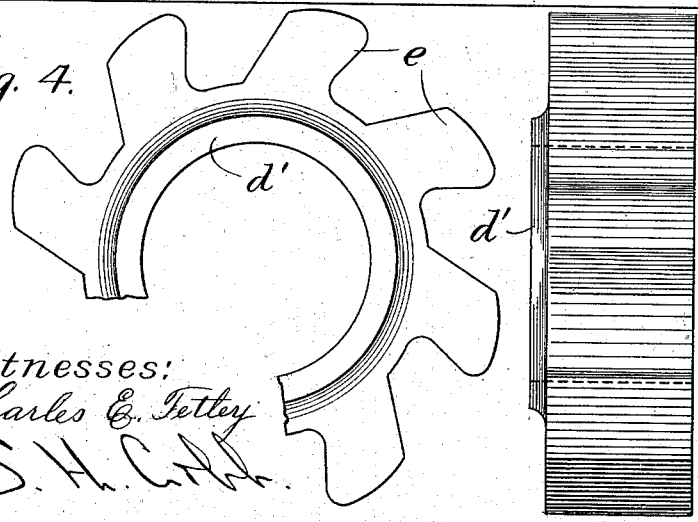
Fig. 4.
Fig. 5.
Witnesses:
Charles E. Tetley
S. H. Gra—
Inventor:
Orrin B. Peck (No Model.) 7 Sheets—Sheet 7.

O. B. PECK.
PULVERIZING MACHINE.

No. 560,639. Patented May 19, 1896.

Witnesses:
Charles E. Tetley
S. H. Carr

Inventor:
Orrin B. Peck

UNITED STATES PATENT OFFICE.

ORRIN B. PECK, OF CHICAGO, ILLINOIS.

PULVERIZING-MACHINE.

SPECIFICATION forming part of Letters Patent No. 560,639, dated May 19, 1896.

Application filed September 12, 1895. Serial No. 562,329. (No model.)

*To all whom it may concern:*

Be it known that I, ORRIN B. PECK, a citizen of the United States, residing at Chicago, in the county of Cook and State of Illinois, have invented a new and useful Improvement in Pulverizing-Machines, of which the following is a specification.

My invention relates more particularly to machines for pulverizing ore and similar substances, and has for its object the various details of construction hereinafter described and claimed.

Figure 1:
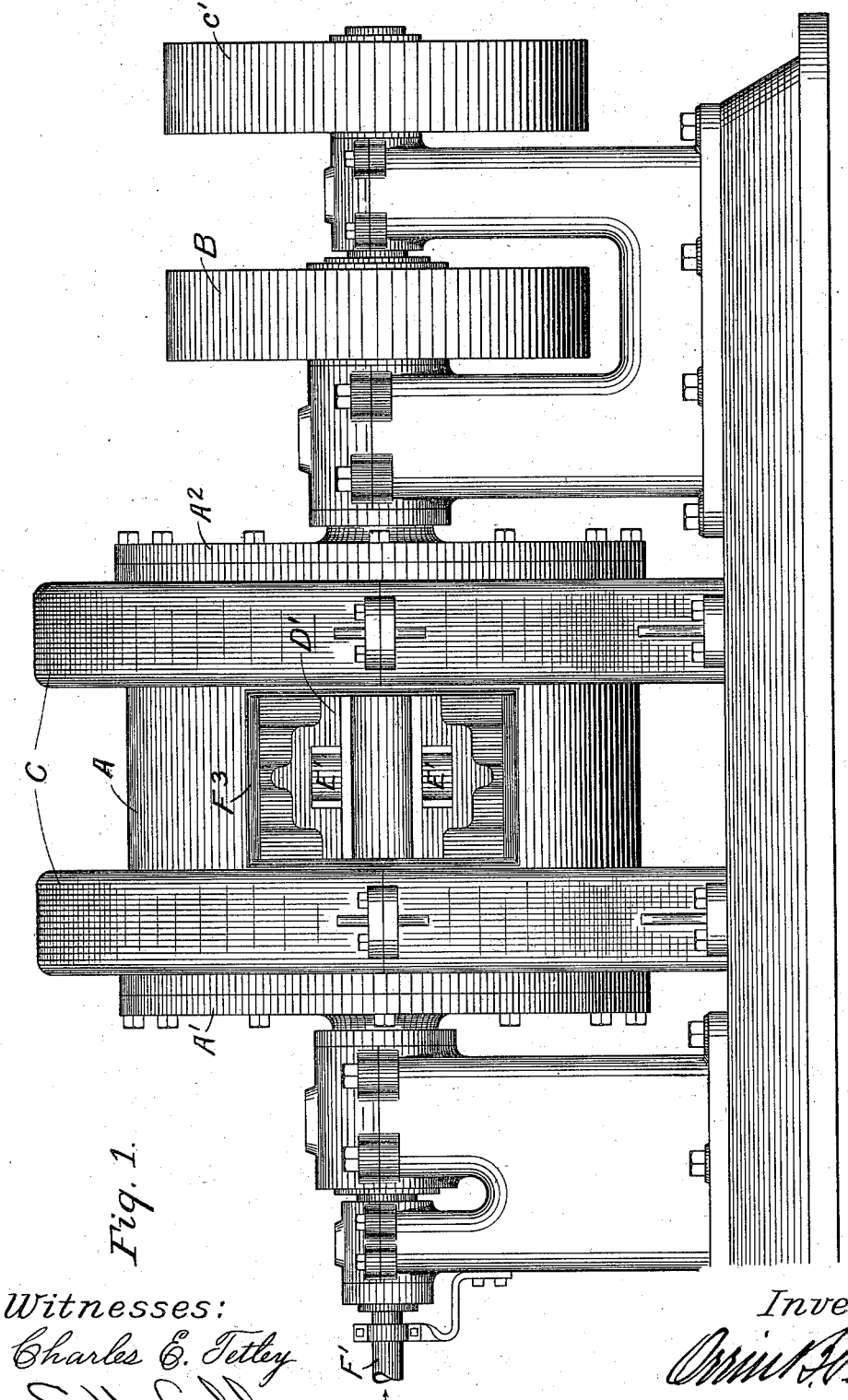
Figure 2:
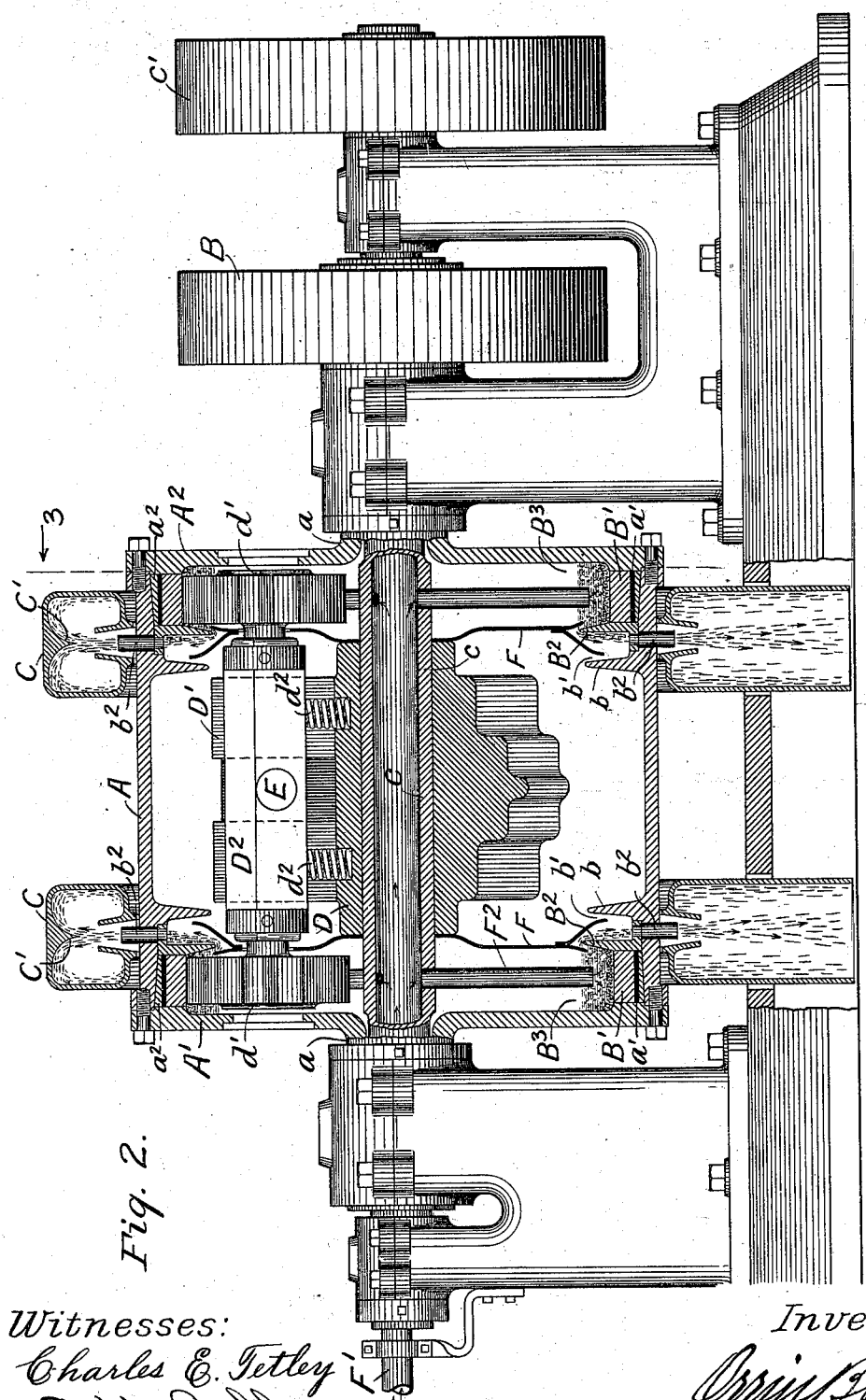
Figure 6:
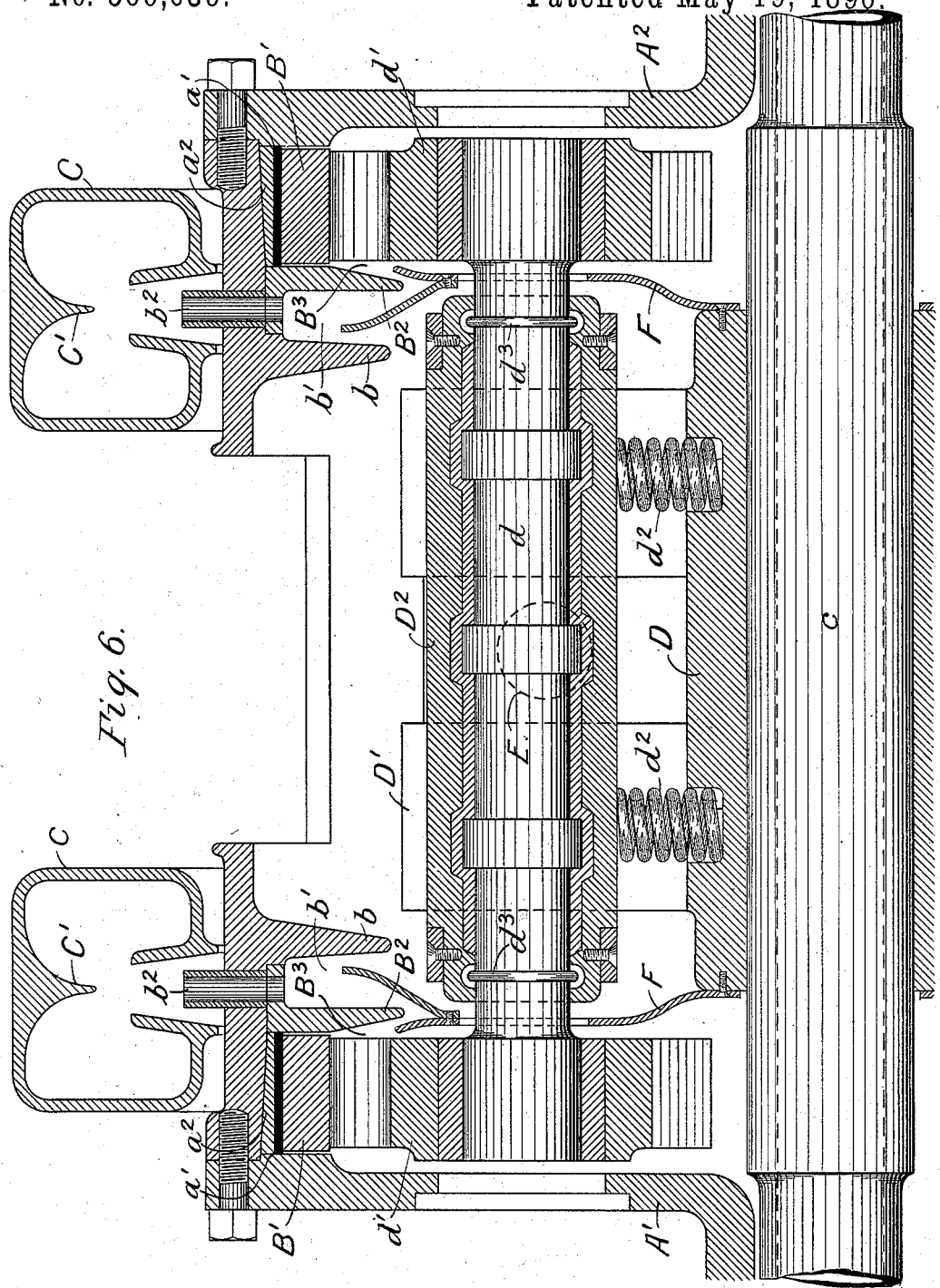
Figures 7, 8:
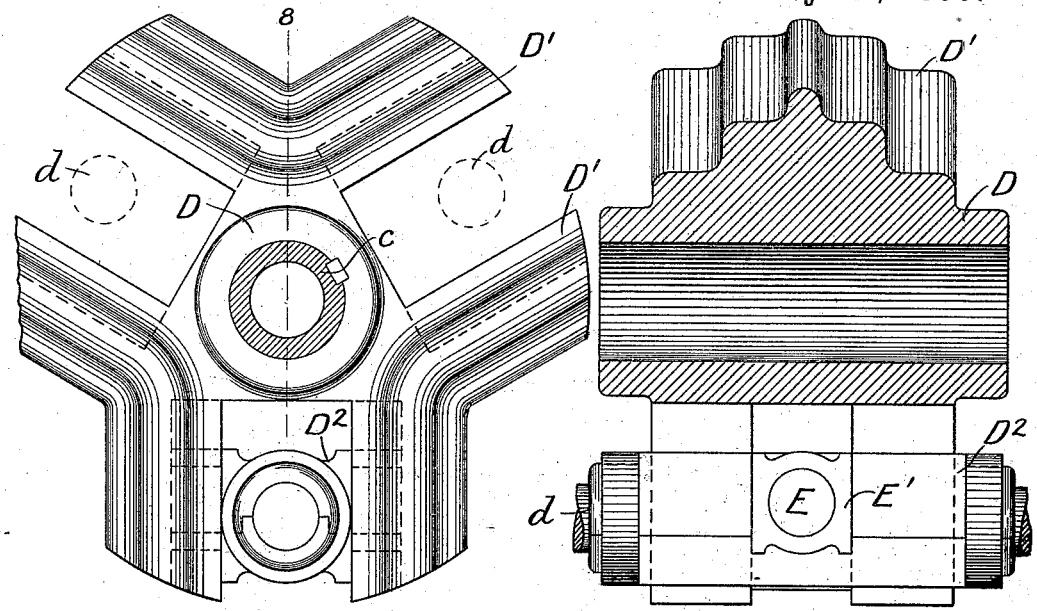
Figure 9:
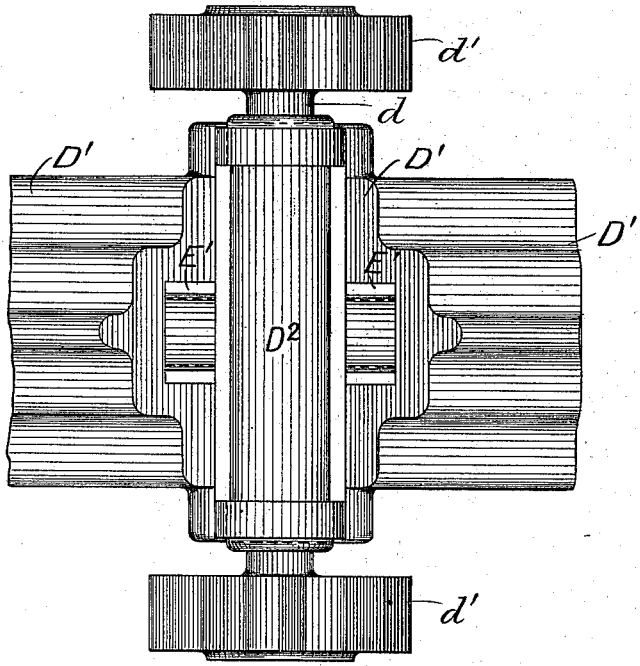
Figure 10:
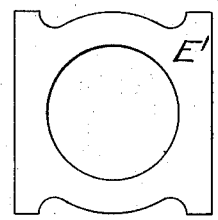
Figure 11:
Figure 12:
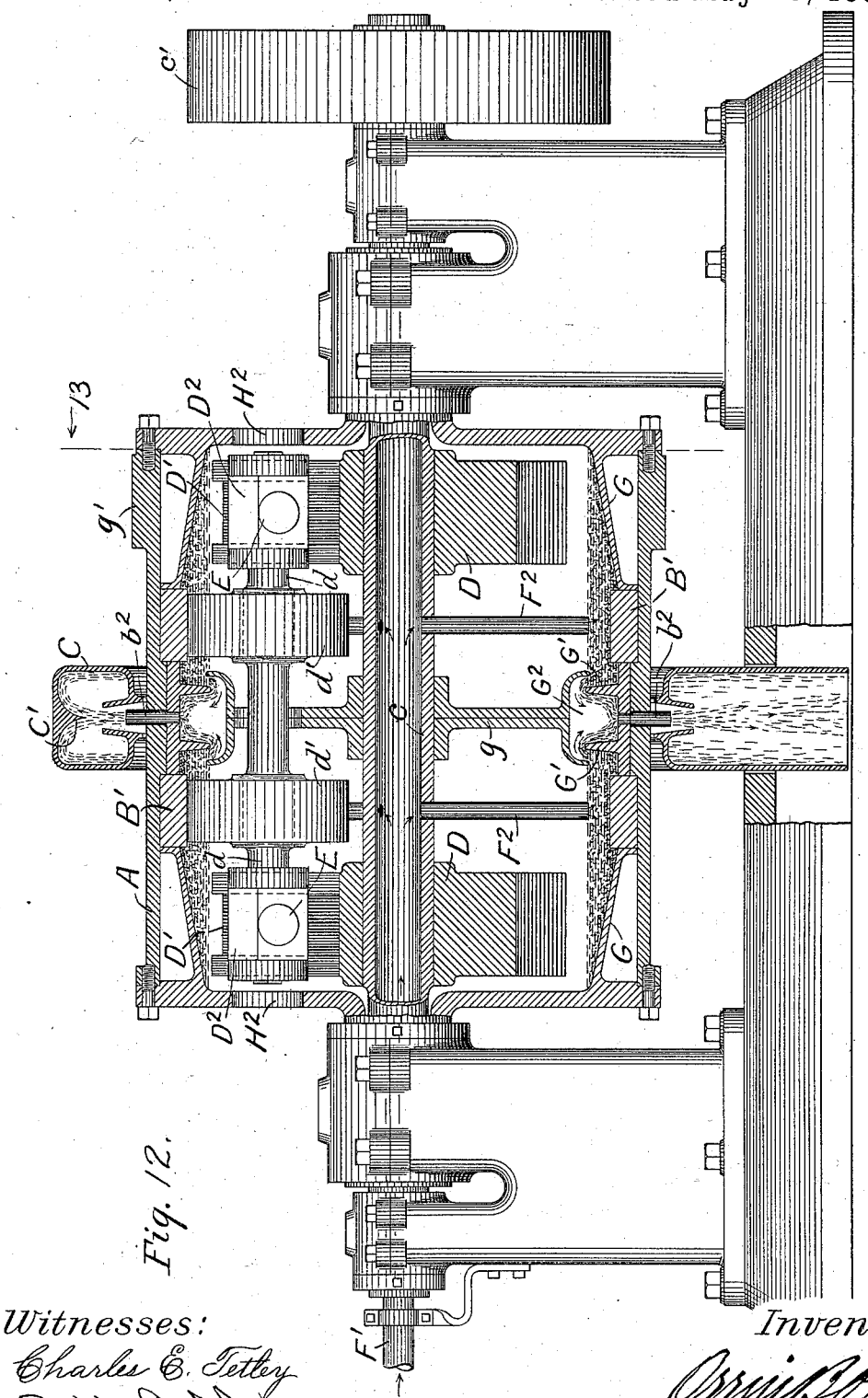
Figure 13:
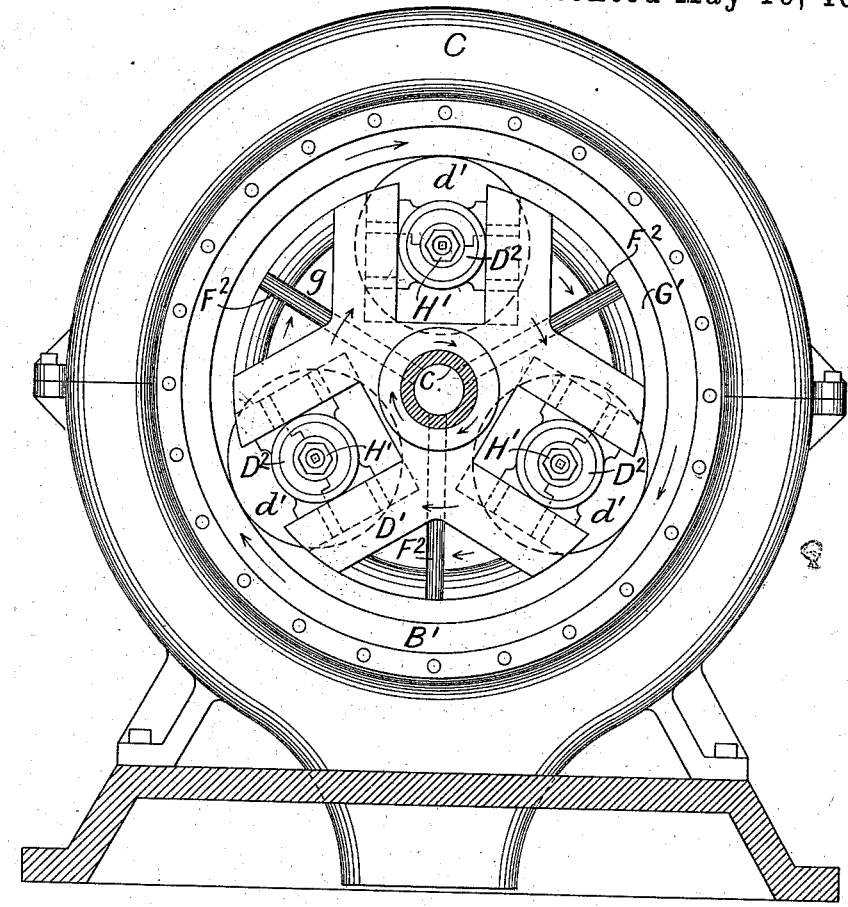
Figure 15:
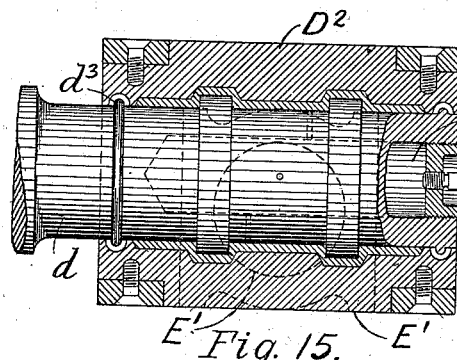
Figure 14:
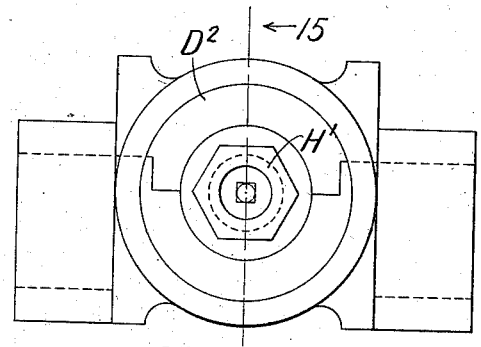

In the drawings, Figure 1 is a side elevation of my improved pulverizing-machine. Fig. 2 is a central vertical longitudinal section through the center of the treatment vessel. Fig. 3 is a transverse section on the line 3 of Fig. 2. Figs. 4 and 5 are enlarged details, in side and end elevation, of one of the pulverizing-rolls. Fig. 6 is a longitudinal section on the line 6 of Fig. 3, somewhat enlarged. Fig. 7 is a detail view, in side elevation, of the roll-supporting hub or spider. Fig. 8 is a section on the line 8 of Fig. 7. Fig. 9 is a bottom plan view of the hub D. Figs. 10 and 11 are detail views, in side elevation and plan, of one of the sliding boxes E'. Fig. 12 is a central vertical longitudinal section through the pulverizing vessel of a modification of my improved machine. Fig. 13 is a transverse section on the line 13 of Fig. 12. Fig. 14 is an enlarged end elevation of one of the sliding roll boxes or bearings of Fig. 12, and Fig. 15 is a section on the line 15 of Fig. 14. All sections are taken in the direction indicated by the arrows.

Similar letters refer to like parts throughout the several views of the drawings.

A designates a pulverizing vessel or casing composed of a preferably cylindrical shell and ends or heads $A'$ $A^2$, from which extend hollow trunnions $a$ $a$, journaled in suitable standards. The pulverizing vessel is rotated by a pulley B on one of the trunnions, belted to any desired source of power. Within the vessel and at opposite ends thereof, preferably abutting against the heads, are pulverizing-dies $B'$ $B'$. These dies are preferably supported by a backing or cushion $a'$ of rubber or other elastic material, which may be as a continuous ring or in sections. The cushions are held tightly in place by wedges $a^2$, usually of wood, driven in between them and the wall of the vessel. This construction serves to diminish the shocks produced by the pulverizing mechanism in operation. Adjacent to the dies at the inner side are inwardly-extending annular rings or partitions $B^2$ $B^2$. These partitions form with the heads of the vessel channels $B^3$ $B^3$, of sufficient depth to allow the submergence of material over the pulverizing-surfaces. Near the partitions $B^2$, integral with or secured to the wall of the vessel, are similar partitions $b$ $b$, forming with $B^2$ annular channels $b'$ $b'$, from which open discharge-orifices in which are fitted outwardly-extending pipes or tubes $b^2$. Encircling the discharge-pipes are annular hoods or troughs C C, having on their inner periphery annular openings into which the pipes extend. These hoods receive the discharged material and liquid and conduct it to a suitable receptacle. Within the hoods, on the wall opposite the discharge-pipes, are inwardly-projecting pointed ribs $C'$ $C'$, which deflect the discharge to the sides of the hoods and prevent material from accumulating or caking upon the walls and dropping back upon the revolving parts from the top.

Through the trunnions $a$ $a$ passes a hollow shaft $c$, journaled in the standards supporting the pulverizing vessel and rotated in the same direction and preferably at a greater speed by a pulley $c'$. Secured to this shaft within the vessel is a hub or spider D, carrying pairs of outwardly-projecting arms $D'$ $D'$, movably supporting long journal-bearings $D^2$. In these bearings are mounted shafts $d$, upon which are annular enlargements or collars extending into annular grooves in a bushing to prevent the longitudinal movement of the shafts. On the outer ends of the shafts are pairs of pulverizing or reducing rolls $d'$ $d'$, which are held in contact with the reducing-surface of the dies $B'$ $B'$ by springs $d^2$, preferably of spiral form, interposed between the boxes $D^2$ and the hub, and also by the centrifugal force generated in their rotation. Near each end of the roll-shafts is a ring $d^3$ in a groove in the bearing sufficiently large to leave a channel about the ring, serving to prevent dirt from passing along the shafts into the boxes. To prevent the longitudinal displacement of the bearings, they are each provided with short cylindrical projections or journals E E, engaging boxes E' E', sliding in ways or grooves in the arms D' D'.

The pulverizing-rolls are of irregular contour, having separated projections or teeth $e$. The material on the pulverizing-surfaces is struck a series of blows by these teeth, which is most effectual in accomplishing a proper reduction of the material.

Secured to the opposite ends of the hub are partitions or shields F F, having a double end, which embraces the inner edges of the rings or partitions $B^2$ $B^2$, serving to prevent the water and the material being reduced from being spattered into the center of the pulverizing vessel.

Into one end of the hollow shaft $c$ extends a feed-pipe F' through a suitable packing-box, and within the pulverizing vessel the shaft is provided with orifices, in which are fitted pipes or passages $F^2$, extending to a point between the rolls and in proximity to the reducing-surface of the dies B' B'.

The pulverizing vessel is preferably provided with large openings $F^3$ in its cylindrical portion, through which access may be had to the revolving parts therein to allow cleaning or removal.

The modification illustrated in Figs. 12 to 15 is in most essential respects like the form already described; but the dies and rolls, instead of being at the ends of the pulverizing vessel, are near the center, the roll-shafts being supported and rotated by bearings in separate hubs or spiders placed near the ends of the vessel. Annular inclined plates G G, integral with or secured to the heads A' $A^2$, direct the material being reduced upon the face of the dies, and between said dies annular rings or partitions G' G' form a common channel $G^2$, into which the discharge flows, and also, with the plates G, channels over the pulverizing-surfaces. A single shield $g$, having branching ends extending over the outer sides of the partitions, serves to direct the ore and the water into the channel. The pulverizing vessel is rotated by a belt upon a belt surface or pulley $g'$ upon its exterior. In connection with this form of machine is shown a device for supplying a lubricant to the roll-shaft journals. (See Figs. 12 and 15.) In the ends of the shafts D, in the portion within the bearings, are cylindrical recesses H, closed by screw-caps H'. From these recesses are holes through the walls of the shafts to carry the lubricant to the bearing-surfaces. In the head $A^2$ of the pulverizing vessel are hand-holes registering with the caps H', through which they may be readily removed and the recesses H filled with the lubricating material.

In operation, the material, having received, if necessary, a preliminary crushing by some of the ordinary methods, is fed into the vessel, preferably mingled with water, through the pipe F', and, passing through the pipes $F^2$, is urged outward by centrifugal force to the surface of the dies B'. The centrifugal force developed by the rotation of the pulverizing vessel holds the material upon the dies while it is subjected to the stamping action of the projections on the pulverizing-rolls, which are held outward by the springs and the centrifugal force developed by their rotation. The water introduced with the material fills the channels $b'$, submerging the pulverizing-surface, and, flowing over the annular partitions $B^2$, escapes through the discharge-pipes, into which it is deflected by the partition $b$. When the material has been sufficiently reduced to allow the disturbance produced by the pulverizing mechanism and the flow of water to effect the suspension of the lighter portion in the liquid, it passes inward toward the axis of rotation over the top of the partitions into the channels $b'$ $b'$ or $G^2$, and is discharged therefrom into the hoods C and conveyed to a suitable receptacle.

The differential speed of rotation of the vessel and rolls will vary according to the particular material under treatment. When it is of a refractory nature and difficult to pulverize, or an extremely fine state of division is required, the speed of rotation of the pulverizing vessel will be more rapid to cause centrifugal force to retain it for a longer time under the influence of the reducing agencies. The speed of rotation of the rolls will be governed by that of the vessel, and also by the nature of the material, depending on the rate at which it is desired that the projections $e$ shall strike. Upon the relative speeds of the two rotating portions will depend the violence of agitation produced in the ore and water, and therefore the size of the suspended particles discharged.

Of course many changes in construction might be made without departing from the spirit of my invention.

What I claim as my invention, and desire to secure by Letters Patent, is—

1. In a pulverizing-machine, the combination of a rotatable casing, one or more pulverizing-surfaces carried thereby upon which material is held by centrifugal force, one or more rotatable hubs or spiders within said casing and traveling at a different speed therefrom, and one or more pulverizing-rolls of irregular circumferential contour, loosely mounted upon the same and forced into contact with the surfaces, substantially as described.

2. In a pulverizing-machine, the combination of a rotatable casing, one or more pulverizing-surfaces carried thereby upon which material is held by centrifugal force, one or more rotatable hubs or spiders within said casing and traveling at a different speed therefrom, and one or more pulverizing-rolls of irregular circumferential contour, loosely mounted upon the same and forced into contact with the surfaces by centrifugal force, substantially as described.

3. In a pulverizing-machine, the combination of one or more annular, revoluble pulverizing-surfaces, one or more inwardly-extending partitions or rings adjacent thereto, and a double partition or shield extending on each side of said rings, substantially as described.

4. In a pulverizing-machine, the combination of one or more annular, revoluble pulverizing-surfaces, one or more inwardly-extending partitions or rings adjacent thereto, and a double rotatable partition or shield extending on each side of said rings, substantially as described.

5. In a pulverizing-machine, the combination of a casing, pulverizing-surfaces at each end thereof, pulverizing mechanism journaled between said surfaces, and a double partition or shield embracing an inwardly-extending partition or ring at the inner sides of the reducing-surfaces, substantially as described.

6. In a pulverizing-machine, the combination of a rotatable vessel, a pulverizing-surface therein on which material is held by centrifugal force, and a hollow shaft extending therethrough carrying pulverizing mechanism, one or more partitions or shields, and feed-pipes, substantially as described.

7. In a pulverizing-machine, the combination of a pulverizing-surface, one or more pulverizing-rolls, one or more shafts on which said rolls are mounted, one or more journal-bearings therefor, a hub or spider in which the same are movably mounted, and projections or journals on the bearings engaging boxes sliding in the hub, substantially as described.

ORRIN B. PECK.

Witnesses:
MARTHA W. RIDDELL,
RAYMOND H. GARMAN.